Nov. 13, 1934.  W. H. BERGMANN  1,980,252
RAKE
Filed Aug. 26, 1929　　2 Sheets-Sheet 1
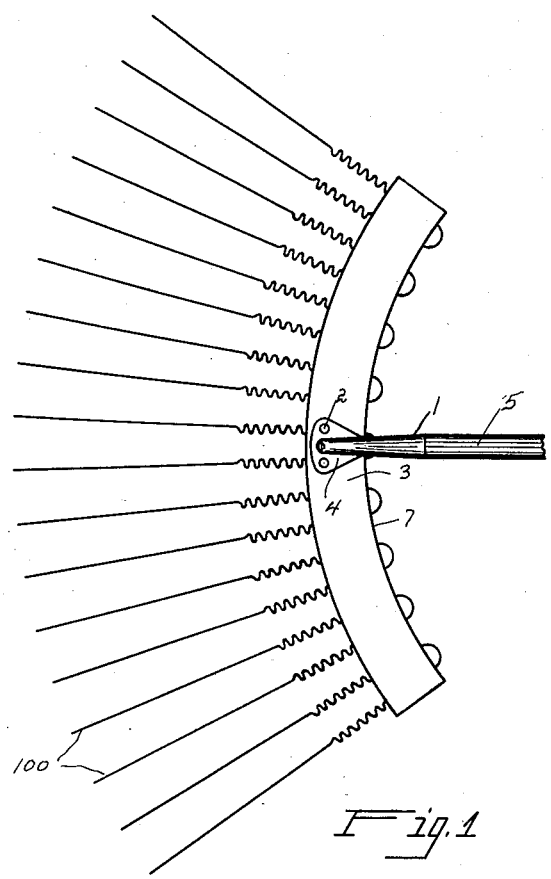
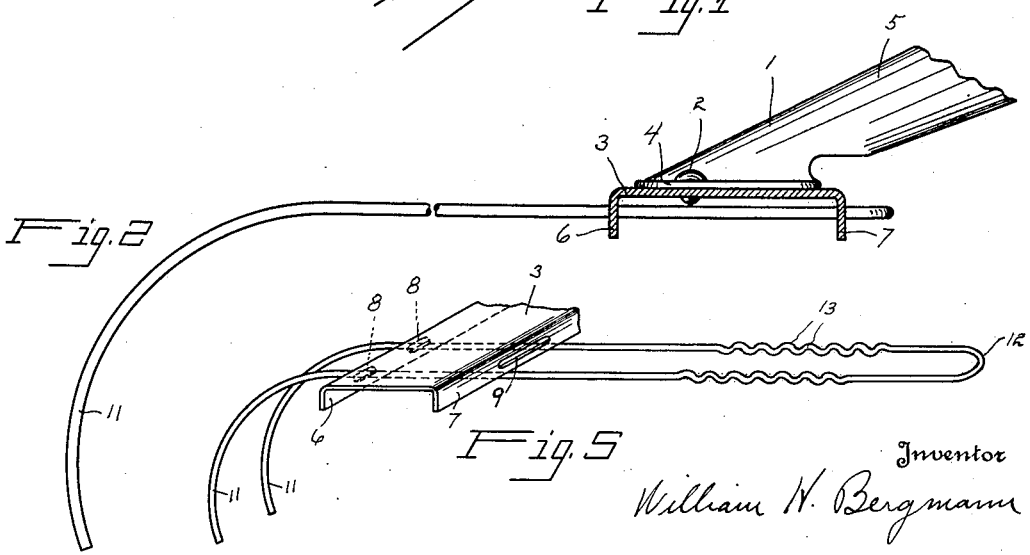
Inventor
William H. Bergmann
By Slough and Canfield
Attorney Patented Nov. 13, 1934

1,980,252

UNITED STATES PATENT OFFICE 1,980,252

RAKE

William H. Bergmann, Cleveland, Ohio, assignor to The American Fork & Hoe Company, Cleveland, Ohio, a corporation of Ohio Application August 26, 1929, Serial No. 388,326

14 Claims. (Cl. 55—10)

My invention relates to improvements in rakes and particularly to improvements in rakes having flexible adjustable tines.

One of the objects of my invention is to provide a rake having flexible tines of adjustable length.

Another object is to provide a rake having flexible tines whereby the degree of flexibility thereof may be adjustably varied.

Another object is to provide a rake having adjustable tines which automatically lock in position when adjustably moved from one position to another.

Another object of my invention is to provide a rake having tines which are readily removable and which are not easily displaced during the normal use of the rake.

Another object of my invention is to provide a rake which is very efficient for a wide variety of uses, such as collecting waste paper and the like from cinders, stones and grass, or for raking soil under cultivation, or for use as a lawn broom.

Another object of my invention is to provide a high grade rake of the above character adapted for manufacture in quantities at a low cost.

Other objects of my invention and the invention itself will become apparent by reference to the following description of an embodiment of my invention and in which description reference will be had to the accompanying drawings illustrating the said embodiment.

Referring to the drawings:

Fig. 1 is a plan view of a rake which is an embodiment of my invention, drawn to a reduced scale and the handle of which is illustrated as being broken away.

Fig. 2 is a side sectional view of the rake, taken approximately from the plane 2 of Fig. 1, drawn to a larger scale than in Fig. 1;

Fig. 5 is a fragmentary perspective view of the tine supporting head of the rake embodying my invention and one of the tines thereof illustrating the method of removing or replacing the tines.

Figure 3:
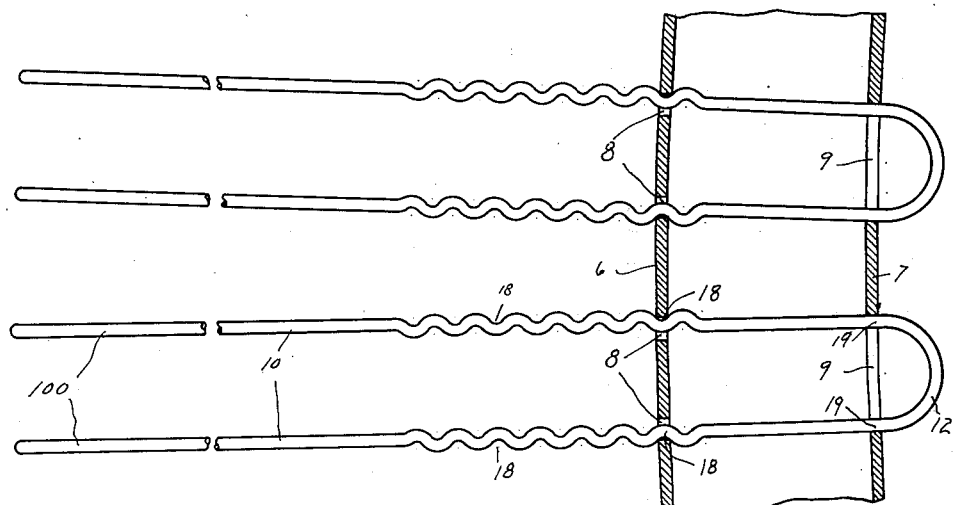
Fig. 3 is a fragmentary sectional view from the plane 3 of Fig. 2 showing two of the tines thereof and in one position of adjustment.

Referring now to the different figures of the drawings, in all of which like parts are designated by like reference characters, at 1, I show a rake handle socket preferably formed or forged from sheet metal secured by rivets 2 to a rake tine supporting head 3 preferably medial of the ends of the head. Rivets 2 pass through suitable perforations in flanges 4 of the rake handle socket and registering perforations in the head 3 to rigidly secure the socket to the head. A handle 5 preferably of wood is inserted in and secured in the rake handle socket. The head is in the form of a channel having front and rear side walls shown respectively at 6 and 7. The channel is bent transversely to conform to a circular or other selected curve concave at the rear wall 7. The head is provided in the front wall 6 with a series of pairs of perforations 8—8 slightly elongated longitudinally and with corresponding single perforations 9 in the rear wall 7 greatly elongated longitudinally. One pair of short perforations 8 is provided for each of the long perforations 9 and the perforations 8 are disposed opposite to and symmetrically positioned with respect to the perforations 9.

The tine elements 100 may be variously formed, but the preferred form from the drawings simulates the form of a wire hair-pin of common type being formed from steel wire bent mid-way of its ends as at 12 into a generally elongated U-form. The end portions forming tine prongs are curvilinearly bent so as to form down-turned ends 11 illustrated in Fig. 2. Each leg 10 of the U-form tine is provided with a plurality of undulations 13—13 arranged in opposite pairs and disposed symmetrically in the opposite legs of the tine. That is to say, any two opposite undulations in the opposite legs of the U-form tine are symmetrically disposed with respect to an axis 16 of the tine and to a line 14 at right angles to the axis.

By reference to Fig. 2 it will be seen that the undulations lie in planes parallel to the head 3 of the channel. Correspondingly, also, the elongated perforations above referred to are parallel in their elongated direction to said head. The tine elements are inserted into the said perforations of the head by the method illustrated in Fig. 5. The free ends or prongs 11—11 of the tine are first inserted through the short perforations 8 and then the closed end 12 of the tine is elevated to the position shown in Fig. 5. The tine is then moved forwardly, to the left, through the perforations 8 until the closed end 12 passes the rear wall 7 of the channel head. The closed end 12 is then elevated and drawn out rearwardly through the long perforation 9 in the rear wall 7. The tines may be removed in a reverse manner.

The tines are formed of resilient wire and before assembling with the head or after removing therefrom, the opposite legs 10 thereof spread apart resiliently, considerably wider than as shown in Figs. 1, 3, 4 or 5 of the drawings. Thus, when the tines have been inserted in the head as described, the legs of the U tend resiliently to spread and thus the legs are brought into engagement with the ends of the perforations 8 and 9 to securely hold the tines in position therein as will now be described.

Referring to Fig. 3, the tines are inserted in the head with the maximum free length of the legs 10. In this position of adjustment, the legs have the maximum flexibility. To adjust the tines to this position, they are inserted in the head, as described in connection with Fig. 5 until the concave portions 18—18 of the first undulations 13 of the tine legs are in the short perforations 8. The resilient spreading tendency of the legs causes the concave portions 18 to engage and grip the end walls of the short perforations 8. At the same time, the smooth non-undulated portion of the tine legs at 19—19 also engage the ends of the long perforations 9. Thus, the tine is held against movement longitudinally of the head by the ends of the perforations 8 and 9 and against movement transversely of the head by the locking engagement of the concave portions 18 of the undulations with the ends of the perforations and against movement in the vertical direction or direction at right angles to the plane of the head 3 by the upper and lower side walls of the perforations. The legs of each tine are individually resilient and load or pull upon one or both of them cannot displace the tine from its described position in the head.

Figure 4:
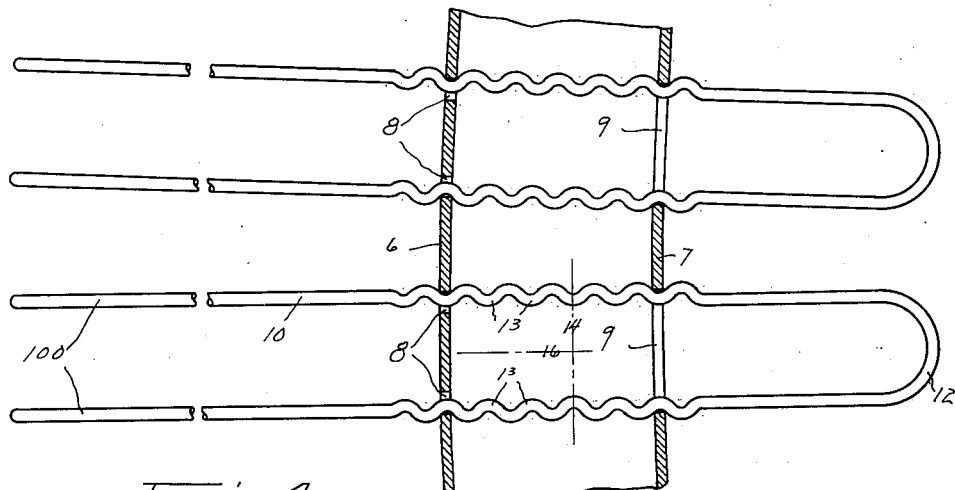
Fig. 4 is a view similar to Fig. 3 showing the rake tines in a different adjusted position.

The tines may be adjusted from the position shown in Fig. 3 in the direction to shorten the free resilient length of the legs to make them stiffer by adjustably moving the tines rearwardly through the perforations in the head. The rearmost or extreme rearward adjustable position of the tines is illustrated in Fig. 4. There, the concave portions 18 of the undulations 13 engage the ends of the long perforations 9 as well as the ends of the short perforations 8 and, in this adjustment also, the legs of the tine are constrained to lie along approximately parallel lines.

It will be understood, of course, that the tines may be adjusted to any position intermediate of the two extreme positions illustrated and described; and in each adjusted position, the combined action of the opening or spreading tendency of the tine and the locking engagement of one or more pairs of the undulations in the legs with the perforations in the head will securely position and lock the tines, as above described. Of course, if desired, one or more of the tines may be adjusted to positions different from that of the others.

If preferred, the two legs of each tine may be constrained to be parallel by suitably spacing the small perforations in respect to the length of the long perforations so that the two adjacent legs of two adjacent pairs of tines will lie in radial directions. This and other modifications which will occur to those skilled in this art may be made within the scope of my invention without departing from the spirit thereof.

I claim:

1. In a rake, a supporting head of channel form, having front and rear channel walls, means adapted to effect a junction between said head and a rake handle, a plurality of tine elements each having a pair of forwardly extending tine legs and a rearwardly disposed resilient hair-pin-loop, the forward side walls being perforated at intervals longitudinally thereof by pairs of longitudinally extending perforations and the rear wall being perforated at corresponding intervals by single longitudinally extending perforations, the tine legs being adapted to be inserted forwardly through the pairs of perforations and the loop being adapted to be subsequently inserted rearwardly through the single perforations, each leg being provided with a plurality of laterally deflected undulations adapted to interchangeably interlock with the corresponding edges of the pairs of perforations for restraining longitudinal displacement of the tine element in the head.

2. In a rake, a transverse head of substantially channel form having a channel web and forwardly and rearwardly disposed channel side walls, said side walls each being pierced at intervals longitudinally thereof, to provide tine receiving openings elongated in a direction extending transversely of the rake, and a plurality of tine elements each having a forwardly extending tine leg and a rearwardly disposed resilient hair-pin-loop insertable respectively through aligned openings of said front and rear channel walls and each provided with a laterally deflected off-set portion adapted to interlock with an edge of one of said openings for restraining longitudinal displacement of the tine element, said off-set portion being interchangeably engageable with an edge portion of an opening through either the front or rear channel wall, to longitudinally adjustably position the prong relative to the head.

3. In a rake, a transverse head of substantially channel form having a channel web and forwardly and rearwardly disposed channel side walls, said side walls each being pierced at intervals longitudinally thereof, to provide tine receiving openings elongated in a direction extending transversely of the rake, and a plurality of tine elements each having a forwardly extending tine leg and a rearwardly disposed resilient hair-pin-loop insertable respectively through aligned openings of said front and rear channel walls and each leg being provided with a plurality of laterally deflected longitudinally spaced off-set portions adapted to interchangeably interlock with an edge of one of said openings for restraining longitudinal displacement of the tine element.

4. In a rake, a transverse head of substantially channel form having a channel web and forwardly and rearwardly disposed channel side walls, a plurality of tine elements each having a pair of forwardly extending tine legs and a rearwardly disposed resilient hair-pin loop, the forward side walls being perforated at intervals longitudinally thereof by pairs of elongated perforations extending transversely of the rake and the rear wall being perforated at corresponding intervals by single longitudinally extending perforations to provide openings respectively for the tine legs and said loops, each leg being provided with a plurality of laterally deflected undulations adapted to interchangeably interlock with the corresponding edges of the pairs of perforations for restraining longitudinal displacement of the tine element in the head.

5. In a rake, a transverse head of substantially channel form having a channel web and forwardly and rearwardly disposed channel side walls, a plurality of tine elements each having a pair of forwardly extending tine legs and a rearwardly disposed resilient hair-pin-loop, the forward side walls being perforated at intervals longitudinally thereof by pairs of longitudinally extending perforations and the rear wall being perforated at corresponding intervals by single longitudinally extending perforations to provide openings respectively for the tine legs and said loop, at least one leg of each tine being provided with a plurality of laterally deflected undulations adapted to interchangeably interlock with the corresponding edges of at least one of the pairs of perforations for restraining longitudinal displacement of the tine element in the head.

6. In a rake, a head having front and rear walls, a plurality of tine elements supported thereby and projected forwardly therefrom, said tine elements each comprising a pair of tine legs and a joining loop portion, perforations in the front and rear walls, said tine legs adapted to be projected through said front wall perforations, and said loop portions adapted to be projected through said rear wall perforations, each of said tine elements being provided with a plurality of laterally deflected undulations adapted to interchangeably interlock with said walls to restrain longitudinal displacement of the tine element in the head.

7. In a rake, a head having front and rear walls, a plurality of tine elements supported thereby and projected forwardly therefrom, said tine elements each comprising a pair of tine legs and a joining loop portion, and perforations in the front and rear walls, said tine legs adapted to be projected through said front wall perforations, and said loop portions adapted to be projected through said rear wall perforations, at least one leg of each of said tine elements being provided with a longitudinal series of laterally deflected undulations adapted to interchangeably interlock with a wall to restrain longitudinal displacement of the corresponding tine element in the head, and to correspondingly variably determine the length of the projecting portion of said tine element and the flexibility thereof.

8. In a rake, a handle, an elongated head secured to the handle extending transversely thereof, and a plurality of removable replaceable tines supported on the head and projecting forwardly therefrom, the head comprising front and rear walls having each a longitudinal series of perforations, each of the perforations in said rear walls being of loop receiving size, the tines each comprising a pair of legs and a joining loop portion, the tine legs having downwardly deflected ground engaging ends and adapted to be projected forwardly through front wall perforations and the loops adapted to be projected rearwardly through said rear wall perforations, and reversely the loops adapted to be withdrawn forwardly from the rear wall perforations and the legs rearwardly from the front wall perforations whereby the tines supported on the head may be removed and replaced, and at least one of the legs of each tine being provided with a deflected portion engageable with a longitudinal end portion of a perforation to determine a longitudinal position of the tine relative to the head and the deflected portion maintained in engagement with the end portion of the perforation by inherent resilience of the tines.

9. In a rake, a handle, an elongated head secured to the handle extending transversely thereof, and a plurality of removable replaceable tines supported on the head and projecting forwardly therefrom, the head comprising front and rear walls having each a longitudinal series of longitudinal perforations, each of the perforations in said rear walls being of loop receiving size, the tines each comprising a pair of legs and a joining loop portion, the tine legs having downwardly deflected ground engaging ends and adapted to be projected forwardly through front wall perforations and the loops adapted to be projected rearwardly through said rear wall perforations, and reversely the loops adapted to be withdrawn forwardly from the rear wall perforations and the legs rearwardly from the front wall perforations whereby the tines supported on the head may be removed and replaced, and at least one of the legs of each tine being provided with a plurality of deflected portions engageable selectively with a corresponding longitudinal end portion of a perforation to determine a plurality of adjustable longitudinal positions of the tine relative to the head, and the deflected portions maintained in engagement with the end portion of the perforation by inherent resilience of the tine.

10. In a rake, a handle, an elongated head secured to the handle extending transversely thereof, and a plurality of removable replaceable tines supported on the head and projecting forwardly therefrom, the head comprising front and rear walls having each a longitudinal series of perforations, each of the perforations in said rear walls being of loop receiving size, the tines each comprising a pair of legs and a joining loop portion, the tine legs having downwardly deflected ground engaging ends and adapted to be projected forwardly through front wall perforations and the loops adapted to be projected rearwardly through said rear wall perforations, and reversely the loops adapted to be withdrawn forwardly from the rear wall perforations and the legs rearwardly from the front wall perforations whereby the tines supported on the head may be removed and replaced.

11. A one-piece rake tine generally of hairpin form comprising a pair of normally divergent tine prongs integrally united at their rearward ends by a resilient yoke portion, each of said tine prongs provided with an off-set portion adapted to engage a rake head to interlock with separate spaced portions thereof.

12. A one-piece rake tine generally of hairpin form and of generally resilient material, comprising a pair of normally divergent tine prongs integrally united at their rearward ends by a resilient yoke portion, each of said tine prongs provided with an off-set portion adapted to engage a rake head to interlock with a portion thereof, said tine prongs adapted to be constrained in generally parallel relation by said interlocked portions of the rake head.

13. A one-piece rake tine generally of hairpin form comprising a pair of normally divergent tine prongs integrally united at their rearward ends by a resilient yoke portion, at least one of said tine prongs provided with a plurality of undulations adapted to engage a rake head at any selective predetermined position thereof, to interlock therewith.

14. A one-piece rake tine generally of hairpin form comprising a pair of normally divergent tine prongs integrally united at their rearward ends by a resilient yoke portion, each of said tine prongs provided with a plurality of undulations adapted to engage a rake head at any selective predetermined position thereof, to interlock with portions thereof.

WILLIAM H. BERGMANN.